United States Patent [19]
Rockafellow

[11] 3,862,460
[45] Jan. 28, 1975

[54] CAR WASH APPARATUS
[76] Inventor: Elden J. Rockafellow, 1110 Longfellow Ave., Royal Oak, Mich. 48067
[22] Filed: Mar. 19, 1973
[21] Appl. No.: 342,474

[52] U.S. Cl. .............................. 15/97 R, 15/DIG. 2
[51] Int. Cl. ............................................. B60s 3/04
[58] Field of Search ....................... 15/97 R, DIG. 2

[56] References Cited
UNITED STATES PATENTS
3,499,180   3/1970   Hurwitz............................... 15/97 R
3,504,394   4/1970   Weigele et al................... 15/DIG. 2
3,765,043   10/1973   Lesser................................ 15/97 R Primary Examiner—Edward L. Roberts
Attorney, Agent, or Firm—Barnes, Kisselle, Raisch & Choate

[57] ABSTRACT

A car wash apparatus wherein a plurality of longitudinally spaced transversely extending flexible panels are provided in the path of movement of the car and are simultaneously moved longitudinally and vertically in an arcuate path with respect to the path of movement of the car.

6 Claims, 9 Drawing Figures

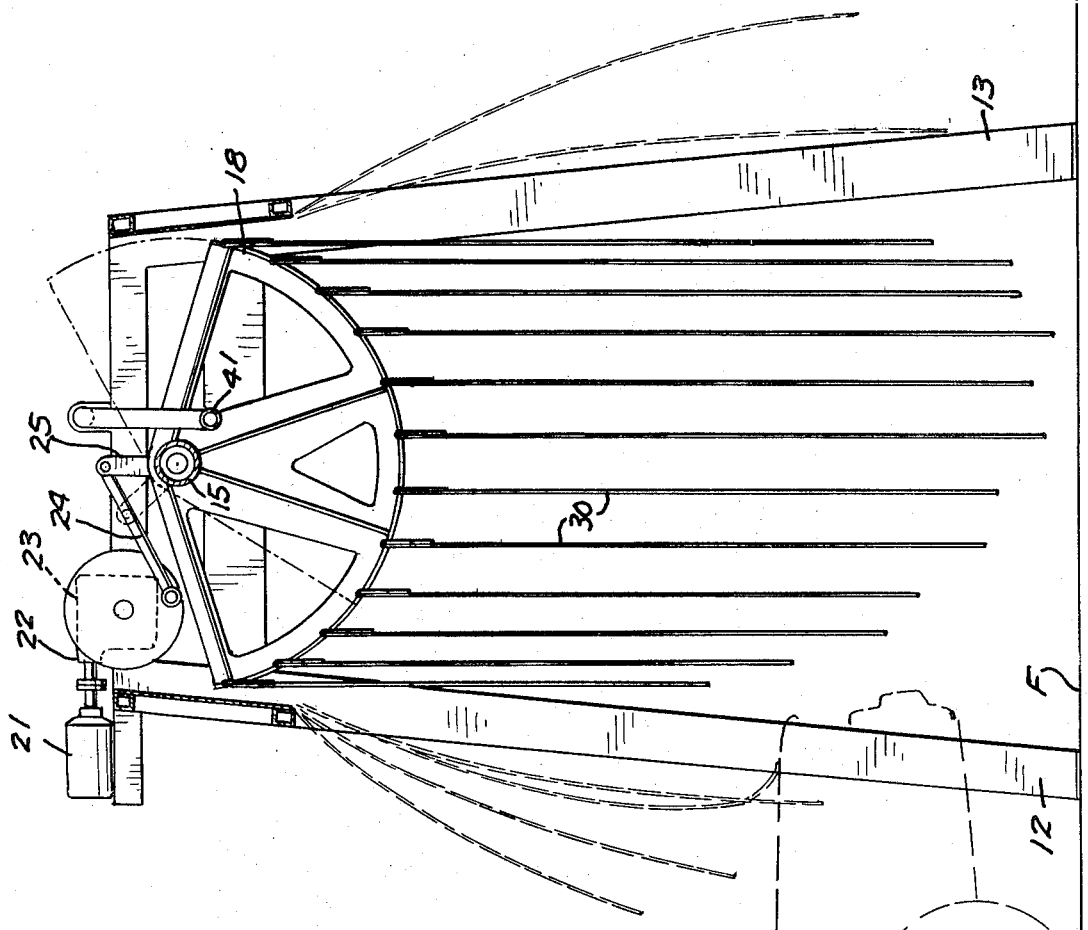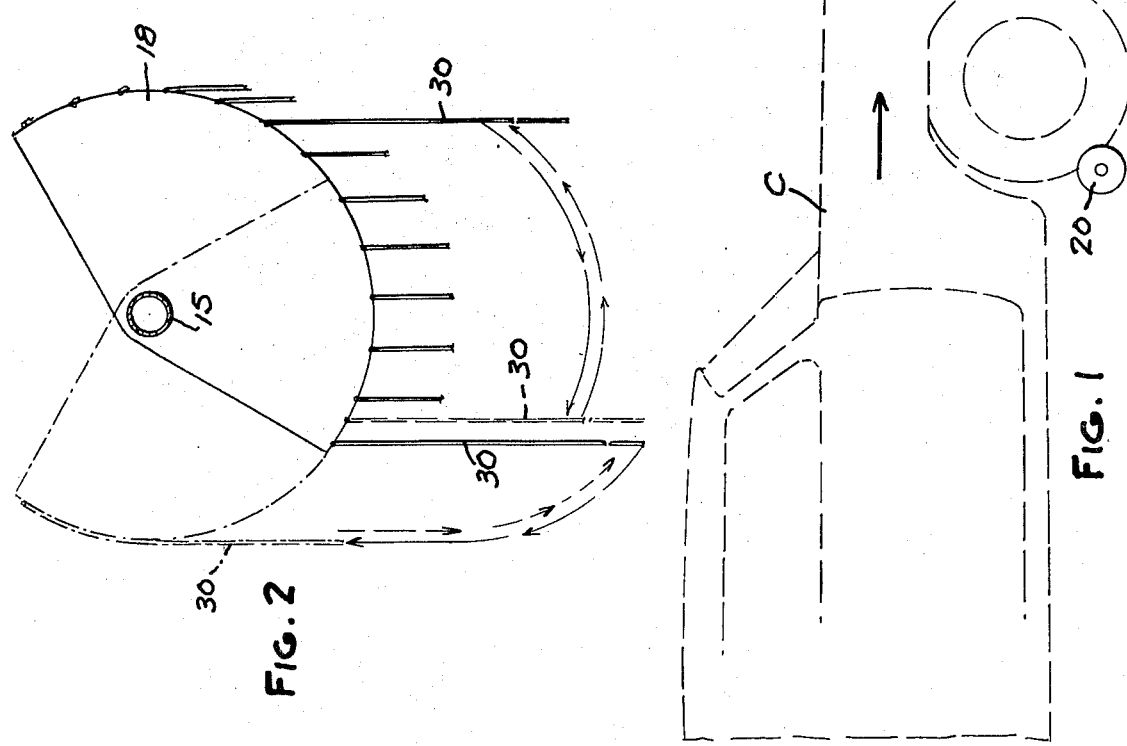

3,862,460

CAR WASH APPARATUS

This invention relates to car wash systems and particularly to a car wash apparatus utilized in a system where the car is moved in a predetermined path.

BACKGROUND OF THE INVENTION

In the washing of cars, one common type of system is to move the car in a predetermined path and subject it to various types of action as it is moved in the path such as brushes and the like. One such action comprises a plurality of panels of flexible material which are provided in the path of the car and moved transversely thereof.

Among the objects of the invention are to provide a car wash apparatus which will effectively clean re-entrant and other configured portions of the vehicle without the need for manual control; which is effective during the normal movement of the car in the predetermined path; and which achieves the washing function efficiently and at low cost.

SUMMARY OF THE INVENTION

In accordance with the invention, a car wash apparatus wherein a plurality of longitudinally spaced transversely extending flexible panels are provided in the path of movement of the car and are simultaneously moved longitudinally and vertically in an arcuate path with respect to the path of movement of the car.

DESCRIPTION OF THE DRAWINGS

FIG. 1 is a fragmentary sectional view taken along the line 1—1 in FIG. 3.

FIG. 2 is a diagram showing the manner in which the car wash apparatus functions.

DESCRIPTION

Figure 3:
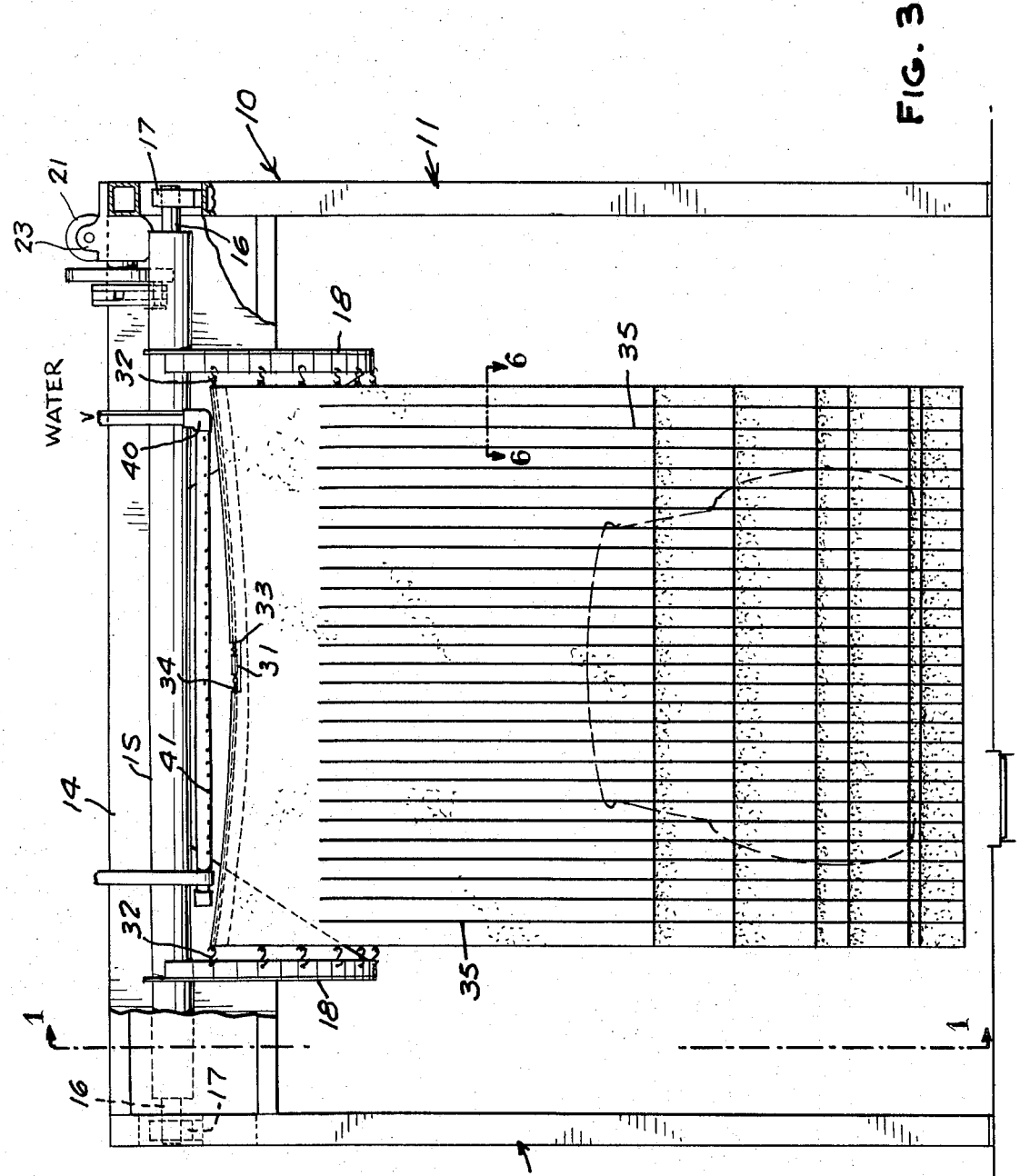
FIG. 3 is a part sectional front elevational view of the apparatus.
Figure 4:
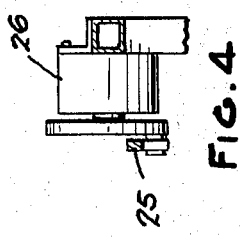
FIG. 4 is a front elevational view of one type of drive motor.
Figure 5:
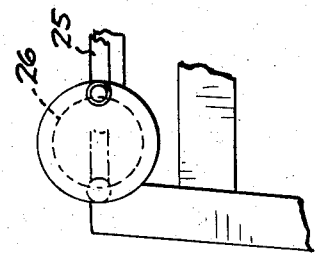
FIG. 5 is a side elevational view of another type of drive motor.
Figure 6:
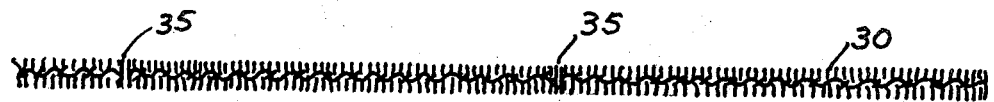
FIG. 6 is a fragmentary sectional view on an enlarged scale taken along the line 6—6 in FIG. 3.

Referring to FIGS. 1 and 3, the car wash apparatus embodying the invention comprises a frame 10 including side stanchions 11 having spaced legs 12, 13 and interconnected by a transverse frame portion 14 extending between the upper ends of the stanchions 11. A horizontal tube 15 is rotatably mounted on a horizontal shaft 16 journalled in bearings 17 on the frame portion 10. Arcuate vertical segments 18 are mounted on the tube 15 and extend generally longitudinally of the tube. A drive mechanism is provided for oscillating the segments 18 back and forth in a direction longitudinally of the path of movement of the car C which is moved in a predetermined path through the apparatus in the car wash system by a conveyor 20 or in any other conventional manner. The drive mechanism is shown in FIGS. 1, 2 and 4 as comprising an electric motor 21 that drives a gearbox 22 rotating an eccentric 23 which through an arm 24 oscillates the lever 25 fixed to the tube 15. Alternatively, as shown in FIG. 5, a hydraulic motor 26 can be provided which oscillates the arm 25 back and forth through predetermined angles as may be desired.

Referring to FIGS. 1 and 3, a plurality of flexible panels 30 are suspended between the segments 18 on cables 31 fastened to the segments by hooks 32. The upper ends of the panels are folded over and sewn about the cables 31. Portions are cut away as at 33 to expose a turn buckle 34 for varying the tension. Each panel 30 is made of a material such as double faced carpeting which will retain water such as a carpeting without a rubber backing sold under the trademark Ozite manufactured by 3M Company, having a pile and being capable of absorbing moisture. The major portion of each panel 30 is slit to form strips 35 through the lower end thereof. The lengths of the panels increase in the direction of movement of the vehicle, the longest panels being furthest the oncoming vehicle. The lower ends of the strips is such that their lower ends define an arc similar to the arc of the lower end of segments 18, each panel being at one portion of the travel substantially on the level with the floor F along which the vehicle is moved.

A stationary transverse pipe 40 is provided adjacent tube 15 and has openings 41 therein for supplying liquid or detergent downwardly onto the panels 30 at various angles.

As the car is moved in its predetermined path, oscillation of the segments 18 causes the panels 30 to move longitudinally as well as vertically with respect to the car. It has been found that the resultant action produces a washing of the vehicle which has not been heretofore possible. The action achieved is one of wiping and agitation and functions at the forward end of the vehicle as shown in FIG. 1, to not only wipe the surfaces, but the free ends of the strips 35 formed by the slit panels wash the re-entrant portions of the vehicle because of the agitation into and around portions of the grill and lights to wash them effectively.

The width of the panels is greater than the width of the car as shown in FIG. 3 so that the strips 35 also wipe and agitate along the surfaces and crevices along the side of the car.

Figure 7:
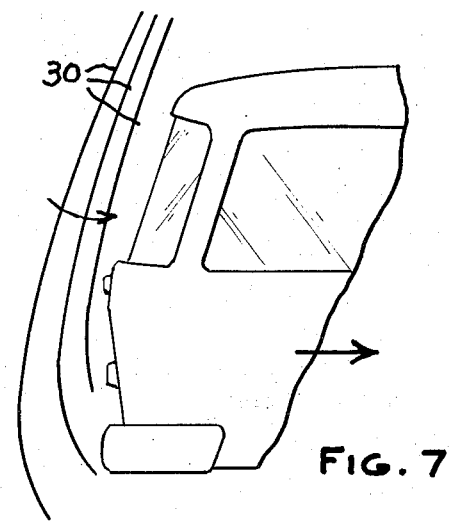
FIGS. 7–9 are partly diagrammatic views showing the manner in which the washing action occurs.
Figure 8:
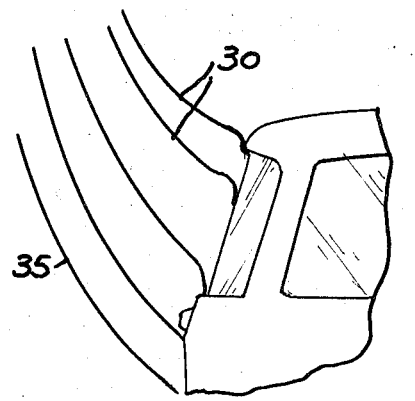

In the case of station wagons as shown in FIGS. 7 and 8, the forward and arcuate movement of the strips in the direction of movement of the car serve to wipe and, at the same time, become suspended on the rear entrant portions adjacent the rear window to effectively wash these areas.

Figure 9:
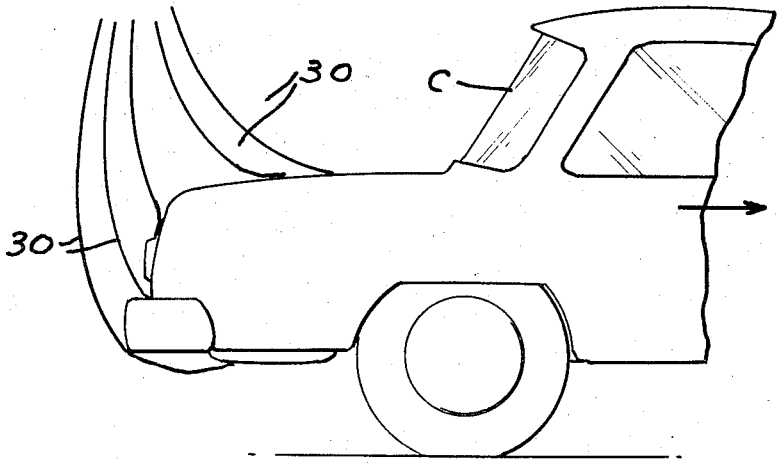

In the case of a sedan as shown in FIG. 9, a similar action is achieved at the rear. The oscillating action back and forth insures that at least some portion of some of the strips will wipe and agitate all surfaces, crevices, recesses, and the like.

It has been found that the car wash apparatus embodying the invention produces a more efficient and effective washing of the surface of the vehicle than prior structures wherein the panels are moved back and forth transversely in the path of movement of the car.

I claim:

1. In a car wash wherein an automotive vehicle is moved in a predetermined path and subjected to successive washing operations, the combination comprising a frame,
means for supporting the frame for oscillating movement about a transverse axis above the path of the vehicles, means for oscillating said frame about said transverse axis, a plurality of panels, each said panel comprising a plurality of transversely spaced vertically extending strips, said frame comprising transversely spaced arcuate segments, each said segment lying in a plane generally parallel to the path of the vehicles, and means for suspending said panels from said arcuate segments such that the panels extend transversely between said arcuate segments and are longitudinally spaced with respect to one another along the path of the vehicle.

2. The combination set forth in claim 1 wherein the lower ends of said panels define an arc similar to the arc of the lower end of the arcuate segments.

3. The combination set forth in claim 1 wherein the length of said panels increases in the direction of movement of the vehicles.

4. The combination set forth in claim 1 including means for applying washing liquid to said panels.

5. The combination set forth in claim 1 wherein the longest of said panels extends substantially to the floor when the panel is at the lowest point of its movement.

6. The combination set forth in claim 1 wherein each said panel has a width greater than the width of the path through which the vehicles advance.

* * * * *

Disclaimer 3,862,460.—*Elden J. Rockafellow*, Royal Oak, Mich. CAR WASH APPARATUS. Patent dated Jan. 28, 1975. Disclaimer filed Dec. 7, 1977, by the inventor.

Hereby enters this disclaimer to claims 1, 2, 4 and 6 of said patent.

[*Official Gazette March 14, 1978.*]